US012294120B2

(12) United States Patent
Lei et al.

(10) Patent No.: US 12,294,120 B2
(45) Date of Patent: May 6, 2025

(54) TOP CAP ASSEMBLY, SECONDARY BATTERY, BATTERY MODULE AND DEVICE

(71) Applicant: Contemporary Amperex Technology Co., Limited, Ningde (CN)

(72) Inventors: Yuyong Lei, Ningde (CN); Chengyou Xing, Ningde (CN); Peng Wang, Ningde (CN); Jianxiong Yang, Ningde (CN); Wenlong Kang, Ningde (CN)

(73) Assignee: Contemporary Amperex Technology (Hong Kong) Limited, Hong Kong (CN)

(*) Notice: Subject to any disclaimer, the term of this patent is extended or adjusted under 35 U.S.C. 154(b) by 774 days.

(21) Appl. No.: 17/547,234

(22) Filed: Dec. 10, 2021

(65) Prior Publication Data

US 2022/0102824 A1    Mar. 31, 2022

Related U.S. Application Data

(63) Continuation of application No. PCT/CN2020/114713, filed on Sep. 11, 2020.

(30) Foreign Application Priority Data

Oct. 30, 2019    (CN) .......................... 201921849034.2

(51) Int. Cl.
*H01M 50/591* (2021.01)
*H01M 50/147* (2021.01)
(Continued)

(52) U.S. Cl.
CPC ....... *H01M 50/591* (2021.01); *H01M 50/147* (2021.01); *H01M 50/176* (2021.01); *H01M 50/566* (2021.01); *H01M 50/588* (2021.01)

(58) Field of Classification Search
CPC .. H01M 50/147; H01M 50/15; H01M 50/176; H01M 50/566; H01M 50/588; H01M 50/591
See application file for complete search history.

(56) References Cited

U.S. PATENT DOCUMENTS

2019/0280257 A1    9/2019   Chen et al.
2021/0119287 A1*   4/2021   Shi ...................... H01M 50/204

FOREIGN PATENT DOCUMENTS

CN    207800665 U      8/2018
CN    208256820     * 12/2018
(Continued)

OTHER PUBLICATIONS

English translation of CN Publication 208256820, Dec. 2018.*
(Continued)

*Primary Examiner* — Brittany L Raymond
(74) *Attorney, Agent, or Firm* — East IP P.C.

(57) ABSTRACT

The present application relates to a top cap assembly, a secondary battery, a battery module, and a device. The top cap assembly includes a top cap plate, having electrode lead-out hole; an electrode terminal, arranged at the top cap plate and covering the electrode lead-out hole; a current collecting member, in which the current collecting member includes a convex portion having an accommodating cavity, at least part of the convex portion is arranged in the electrode lead-out hole, and welded and connected to the electrode terminal to form a welding portion facing the accommodating cavity, and the current collecting member has a connecting hole; an insulating protection member, in which the insulating protection member is arranged at a side of the current collecting member away from the electrode terminal, (Continued)

and the insulating protection member includes a shielding portion and a connecting portion connected with the shielding portion.

20 Claims, 9 Drawing Sheets

(51) Int. Cl.
 *H01M 50/176* (2021.01)
 *H01M 50/566* (2021.01)
 *H01M 50/588* (2021.01)

(56) References Cited

FOREIGN PATENT DOCUMENTS

| CN | 208256820 U | | 12/2018 |
|---|---|---|---|
| CN | 209401664 | * | 9/2019 |
| CN | 209401664 U | | 9/2019 |
| CN | 209880742 U | | 12/2019 |
| CN | 210403894 U | | 4/2020 |
| CN | 210743993 U | | 6/2020 |
| JP | 2011216402 A | | 10/2011 |
| JP | 2012134107 A | | 7/2012 |
| JP | 2019106273 A | | 6/2019 |
| JP | 2019125491 A | | 7/2019 |

OTHER PUBLICATIONS

The extended European search report for European Application No. 20882587.7, dated May 12, 2022, 7 pages.
The First Office Action for JP Application No. 2022-520887, dated May 9, 2023, 8 pages.
The International search report for PCT Application No. PCT/CN2020/114713, dated Dec. 18, 2020, 13 pages.

* cited by examiner

TOP CAP ASSEMBLY, SECONDARY BATTERY, BATTERY MODULE AND DEVICE

CROSS REFERENCE TO RELATED APPLICATION

The present application is a continuation of International Application No. PCT/CN2020/114713, filed on Sep. 11, 2020, which claims priority to Chinese Patent Application No. 201921849034.2, filed on Oct. 30, 2019, titled "TOP CAP ASSEMBLY, SECONDARY BATTERY, BATTERY MODULE AND DEVICE", both of which are hereby incorporated by reference in their entireties.

TECHNICAL FIELD

The present application relates to the technical field of battery, and in particular to a top cap assembly, a secondary battery, a battery module, and a device.

BACKGROUND

With the development of science and technology, secondary batteries have been widely used in portable electronic devices such as mobile phones, digital video cameras, laptop computers and the like; the secondary batteries have widely application prospects in electric transportation facilities, such as electric vehicles, electric bicycles and the like, and medium-sized electric equipment, such as energy storage facilities and the like, and become an important technical means to solve global problems such as energy crisis, environmental pollution and the like. The secondary battery includes a case, an electrode assembly accommodated in the case, an adapter sheet connected to the electrode assembly, and an electrode terminal for charging and discharging the electrode assembly. The adapter sheet has a convex portion connected with the electrode terminal. During processing and manufacturing the convex portion, a concave portion corresponding to the convex portion will be formed at the same time. Metal chips will be generated when the convex portion is welded and connected to the electrode terminal. During using the secondary battery, the metal chips will fall to the electrode assembly, so that there is a risk that the metal chips pierce a separation membrane to cause a short circuit between a cathode sheet and an anode sheet.

SUMMARY

The present application provides a top cap assembly, a secondary battery, a battery module, and a device. The top cap assembly can block metal chips falling from a welding portion to the electrode assembly by an insulating protection member, in which the welding portion is formed by the welding and connection between a current collecting member and an electrode terminal, so that it is beneficial to improving the operational safety of the secondary battery.

The embodiments of the present application provides the top cap assembly for the secondary battery, including
a top cap plate, having an electrode lead-out hole; the electrode terminal, arranged at the top cap plate and covering the electrode lead-out hole; a current collecting member, in which the current collecting member includes a convex portion having an accommodating cavity, at least part of the convex portion is arranged in the electrode lead-out hole, and welded and connected to the electrode terminal to form a welding portion facing the accommodating cavity, the current collecting member has a connecting hole, and the connecting hole has a first opening formed on a surface of the current collecting member away from the electrode terminal; the insulating protection member, in which the insulating protection member is arranged at a side of the current collecting member away from the electrode terminal, the insulating protection member includes a shielding portion and a connecting portion connected with the shielding portion, the shielding portion shields the welding portion, and at least a part of the connecting portion extends into the connecting hole through the first opening and is connected and fixed to the current collecting member.

According to an embodiment of the present application, the convex portion has a top wall and a side wall, the top wall is welded and connected to the electrode terminal to form the welding portion, the connecting hole is formed in the top wall, at least part of the shielding portion is arranged in the accommodating cavity, and the connecting portion is arranged on a surface of the shielding portion facing the top wall.

According to an embodiment of the present application, the welding portion is in the shape of ring, and the connecting hole is formed within the welding portion.

According to an embodiment of the present application, the top wall includes a flat portion and a boss protruding from the flat portion toward the accommodating cavity, the flat portion is welded and connected to the electrode terminal, and the first opening is formed on a top surface of the boss.

According to an embodiment of the present application, the convex portion has a top wall and a side wall, the top wall is welded and connected to the electrode terminal, the connecting hole is formed in the side wall, at least part of the shielding portion is arranged in the accommodating cavity, and the connecting portion is arranged on a surface of the shielding portion facing the side wall.

According to an embodiment of the present application, a circumference surface of the shielding portion is in contact and sealing with the side wall.

According to an embodiment of the present application, the current collecting member further includes a main body, the convex portion is connected to the main body, the connecting hole is formed in the main body, at least part of the shielding portion arranged in the accommodating cavity, and the connecting portion is located at an outside of an opening of the accommodating cavity and extends into the connecting hole to be connected and fixed to the main body.

According to an embodiment of the present application, the connecting portion includes a first connecting segment and a second connecting segment, the first connecting segment is connected to the shielding portion, the connecting hole is a passing-through hole, the first connecting segment is located in the connecting hole, the second connecting segment is located at an outside of the connecting hole, and the second connecting segment completely covers the connecting hole.

According to an embodiment of the present application, the connecting hole is a tapered hole, and the connecting portion is in a tapered shape.

According to an embodiment of the present application, the connecting hole includes a first hole segment and a second hole segment, the second hole segment is located at a side of the first hole segment away from the insulating protection member and a radial dimension of the second hole segment is greater than a radial dimension of the first hole segment, the connecting portion includes a first connecting segment and a second connecting segment, the first connecting segment is connected to the shielding portion, the first connecting segment is located in the first hole segment, and the second connecting segment is located in the second hole segment and covers the first hole segment.

According to an embodiment of the present application, the connecting hole is a passing-through hole, the connecting hole has a second opening formed on a surface of the current collecting member facing the electrode terminal, and the second connecting segment does not extend over an edge of the second opening.

According to an embodiment of the present application, the connecting hole may be a blind hole, the first hole segment and the second hole segment are formed in the top wall of the convex portion, and the first opening of the first hole segment is formed on a surface of the top wall facing the accommodating cavity.

According to an embodiment of the present application, the connecting portion and the shielding portion are formed integrally.

The top cap assembly according to the present application includes the top cap plate, the electrode terminal connected and fixed to the top cap plate, the current collecting member electrically connected to the electrode terminal and the insulating protection member. After the electrode terminal and the top cap plate are connected and fixed, the convex portion of the current collecting member is welded and connected to the electrode terminal by means of welding. The insulating protection member is connected and fixed to the current collecting member by the connecting portion, and the shielding portion of the insulating protection member shields the welding portion. Since the shielding portion shields and covers the welding portion, the shielding portion can block the metal chips attached to the welding portion, thereby reducing the possibility of the metal chips falling from the welding portion to the electrode assembly after the top cap assembly is applied to the secondary battery, so that it can reduce the possibility of the metal chips piercing a separator of the electrode assembly to cause an internal short circuit between two electrode sheets having opposite polarities, and effectively improve the operational safety of the secondary battery.

The embodiments of the present application further provides the secondary battery, including
- a case; an electrode assembly, arranged in the case; the top cap assembly as described above, in which the top cap plate is sealed and connected to the case, and the current collecting member is connected to the electrode assembly.

The embodiments of the present application further provides the battery module, including the secondary battery as described above.

The embodiments of the present application further provides the device using a secondary battery as a power source, including the secondary battery as described above.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

Figure 1:
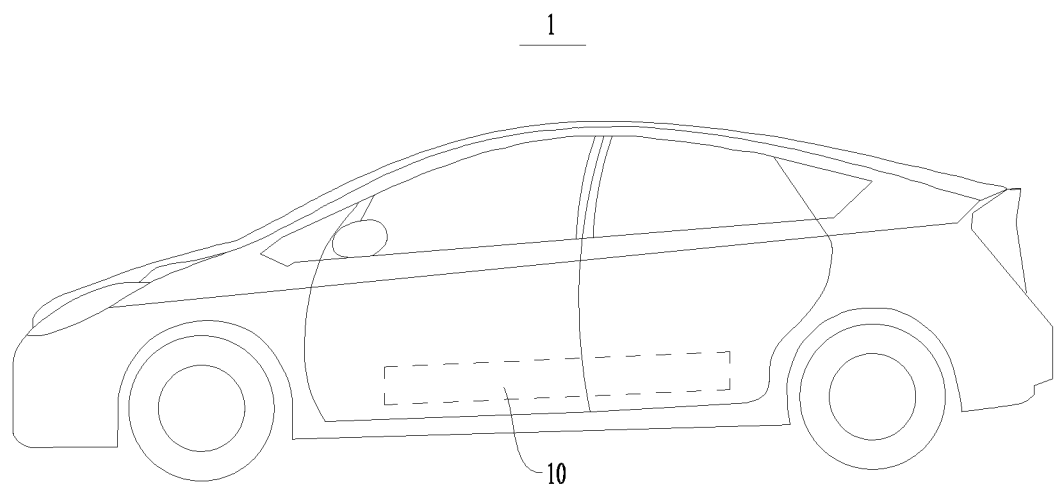
FIG. 1 shows a schematic structural view of a vehicle according to an embodiment of the present application.

In the drawings, the drawings may not be drawn to the actual scale.

In the drawings:
1—vehicle; 10—battery pack; 20—battery module set; 30—secondary battery; 31—case; 32—electrode assembly; 40—top cap assembly; 50—top cap plate; 50a—electrode lead-out hole; 60—electrode terminal; 70—current collecting member; 71—convex portion; 71a—accommodating cavity; 711—top wall; 711a—flat portion; 711b—boss; 712—side wall; 72—main body; 73—connecting hole; 73a—first opening; 73b—second opening; 731—first hole segment; 732—second hole segment; 80—insulating protection member; 81—shielding portion; 82—connecting portion; 821—first connecting segment; 822—second connecting segment; 90—welding portion; X—thickness direction.

DETAILED DESCRIPTION

The embodiments of the present application will be described in further detail below conjunction with the drawings and the embodiments. The detailed description and drawings of the following embodiments are used to exemplarily illustrate the principle of the present application, but cannot be used to limit the scope of the present application, in other words, the present application is not limited to the described embodiments.

In the description of the present application, it should be noted that, unless otherwise specified, "plurality" means more than two; the terms "upper", "lower", "left", "right", "inner", "outer", etc. indicate the orientation or positional relationship only for the convenience of describing the present application and simplifying the description, rather than indicating or implying that the device or the element referred to must have a specific orientation, be configured and operated in a specific orientation, and therefore cannot be understood as a limitation of the present application. In addition, the terms "first", "second", "third", etc. are only used for descriptive purposes, and cannot be understood as indicating or implying relative importance. The term "perpendicular" does not mean strictly perpendicular, but within the allowable range of error. The term "parallel" does not mean strictly parallel, but within the allowable range of error.

The orientation words appearing in the following description are all directions shown in the drawings, and do not limit the specific structure of the present application. In the description of the present application, it should also be noted that, unless otherwise clearly specified and limited, the terms "installed", "connecting" and "connected" should be understood in a broad sense, for example, it can be a fixed connection, a detachable connection, or an integral connection, it can be a direct connection, or it can be connected indirectly through an intermediary. For those of ordinary skill in the art, the specific meaning of the above-mentioned terms in the present application can be understood according to specific situations.

In order to better understand the present application, the embodiments of the present application are described as follows in conjunction with FIG. 1 to FIG. 15.

The embodiment of the present application provides a device using a secondary battery as a power source. The device can be, but is not limited to, a vehicle, a ship, an aircraft or the like. As shown in FIG. 1, an embodiment of the present application provides a vehicle 1 including a vehicle main body and a battery module. The battery module is arranged in the vehicle main body. Herein the vehicle 1 may be a pure electric vehicle, a hybrid electric vehicle or an extended-range vehicle. The vehicle main body is provided with a driving motor electrically connected to the battery module. The battery module provides power to the driving motor. The driving motor is connected to wheels on the vehicle main body through a transmission mechanism to drive the vehicle to travel. In some embodiments, the battery module may be horizontally arranged at a bottom of the vehicle main body.

Figure 2:
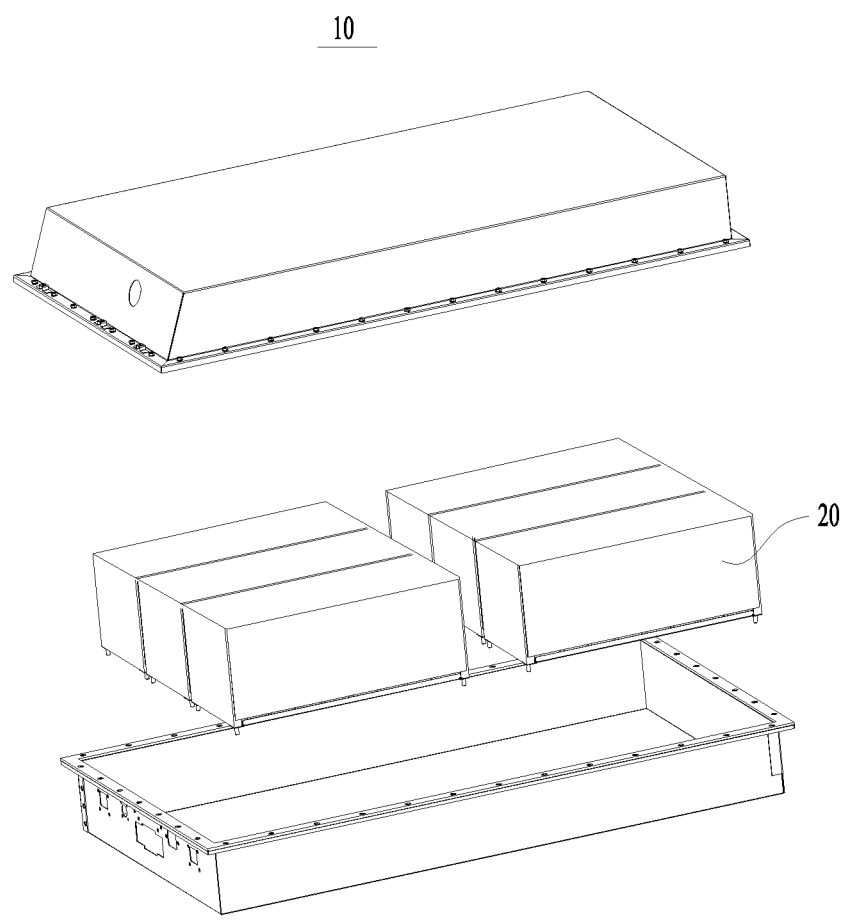
FIG. 2 shows an exploded structural schematic view of a battery pack according to an embodiment of the present application.

As shown in FIG. 2, the battery module may be a battery pack 10. There are many ways to arrange the battery pack 10. In some optional embodiments, the battery pack 10 includes a housing body and the battery module set 20 arranged in the housing body. The number of battery module sets 20 is one or more. One or more battery module sets 20 are arranged in the housing body. The type of the housing body is not limited. The housing body can be a frame-shaped housing body, a disc-shaped housing body, a box-shaped housing body or the like. In some embodiments, the housing body may include a lower housing body for accommodating the battery module set 20 and an upper housing body covering and closing the lower housing body. The upper housing body covers and closes the lower housing body to form an accommodating portion for accommodating the battery module set 20. It should be understood that the battery module may be the battery module set 20, in other words, the battery module set 20 is directly arranged on the vehicle main body.

Figure 3:
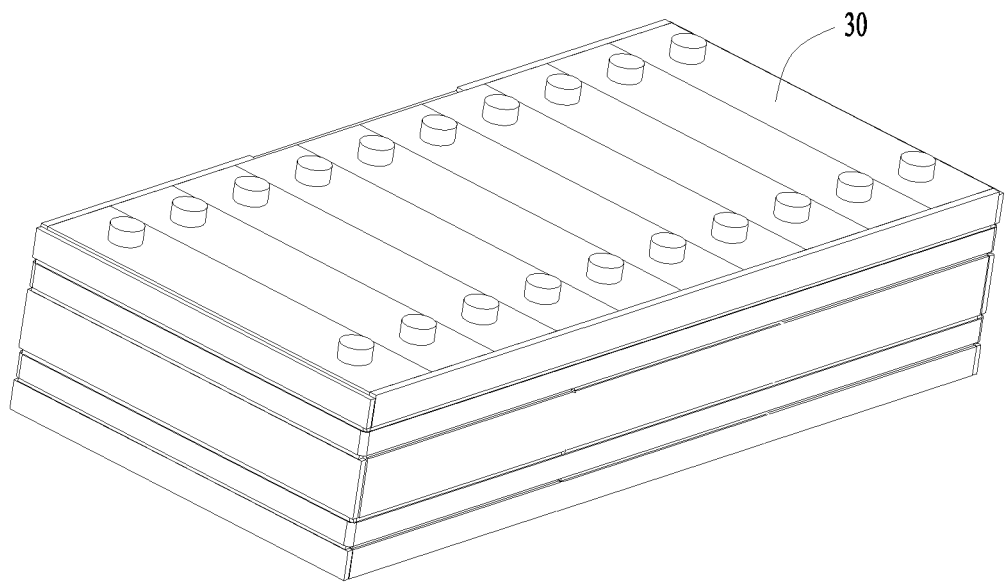
FIG. 3 shows a structural schematic view of a battery module set according to an embodiment of the present application.

As shown in FIG. 3, the battery module set 20 includes a plurality of secondary batteries 30. In an embodiment, the battery module set 20 can be arranged in various ways, and the battery module set 20 includes the accommodating portion and the plurality of secondary batteries 30 located in the accommodating portion. The plurality of secondary batteries 30 are arranged side by side in the accommodating portion. The accommodating portion can be arranged in various ways, for example, the accommodating portion includes a shell and a cap plate arranged to cover the shell; or the accommodating portion includes an end plate and side plates that are successively and connected to one another for enclosure; or the accommodating portion includes two end plates facing each other and a band surrounding the end plates and the secondary batteries 30.

Figure 4:
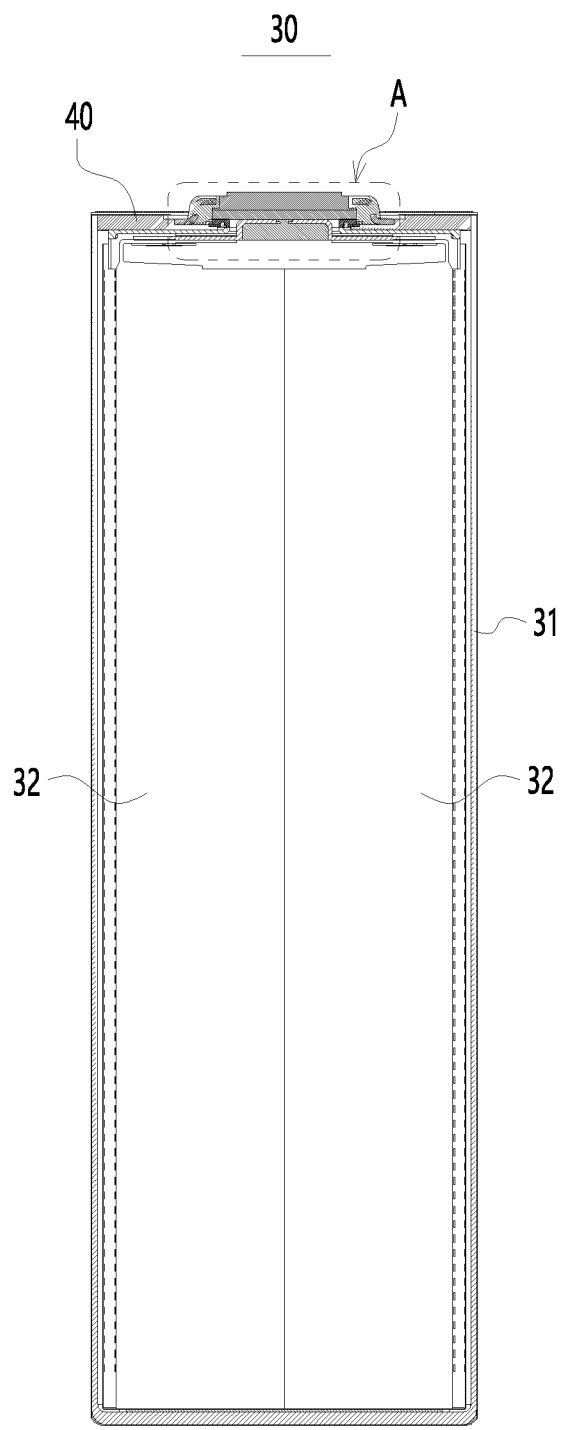
FIG. 4 shows a structural schematic cross-sectional view of a secondary battery according to an embodiment of the present application.

As shown in FIG. 4, the secondary battery 30 in the embodiment of the present application includes a case 31, an electrode assembly 32 arranged in the case 31, and a top cap assembly 40 sealed and connected to the case 31.

The case 31 in the embodiment of the present application has a square-shaped structure or other shapes. The case 31 has an internal space for accommodating the electrode assembly 32 and electrolyte, and an opening communicating with the internal space. The case 31 may be made of materials such as aluminum, aluminum alloy, plastic or the like.

The electrode assembly 60 in the embodiment of the present application may be formed by stacking or winding a first electrode sheet, the second electrode sheet and a separator located between the first electrode sheet and the second electrode sheet together to form a body, herein the separator is an insulator between the first electrode sheet and the second electrode sheet. The body in the embodiment has a flat-sheet-shaped structure as a whole, which has a predetermined thickness, a predetermined height, and a predetermined width. An axial direction of the body is a height direction of itself. The body has two end surfaces facing each other in the axial direction of itself. In the embodiment, exemplarily, the first electrode sheet is used as a positive electrode sheet, and the second electrode sheet is a negative electrode sheet for description. A positive electrode active material can coat a coated area of the positive electrode sheet, and a negative electrode active material can coat a coated area of the negative electrode sheet. The uncoated area extending from the coated area of the body serves as a tab. The electrode assembly 60 includes two tabs, namely, a positive electrode tab and a negative electrode tab. The positive electrode tab extends out of the coated area of the positive electrode sheet, and the negative tab extends out of the coated area of the negative electrode sheet. The body has a wide surface and a narrow surface alternately arranged in a circumference direction of the body.

Figure 5:
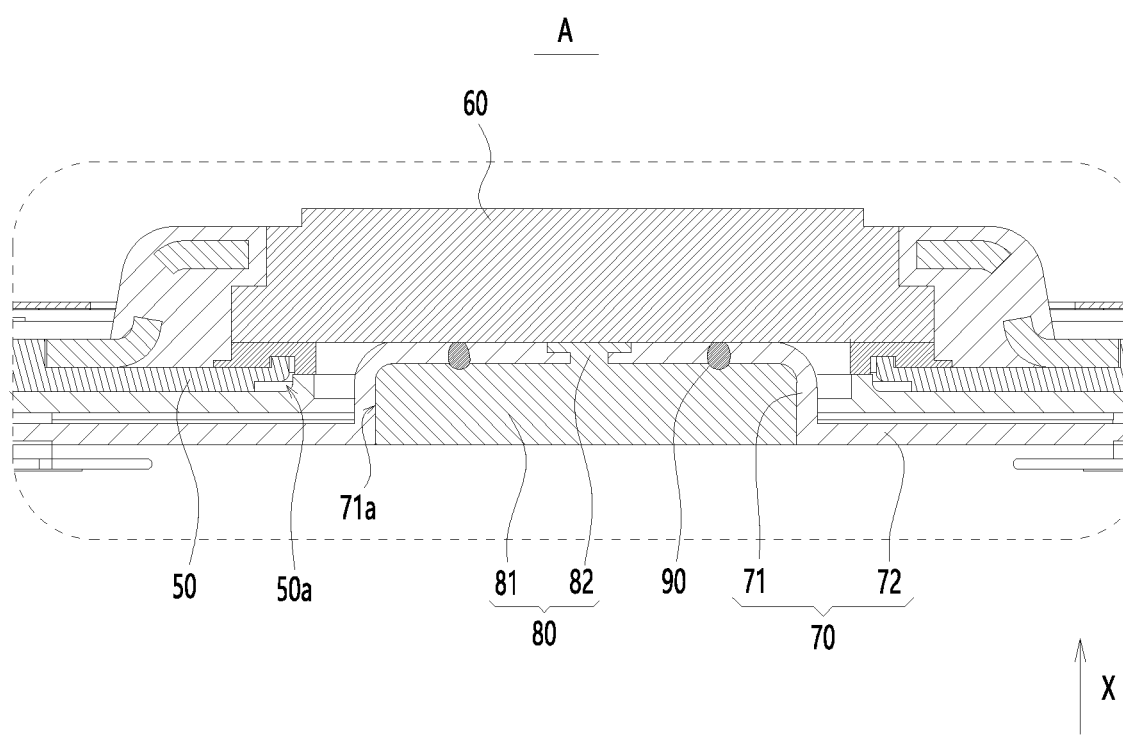
FIG. 5 shows an enlarged view of a portion A in FIG. 4.

As shown in FIG. 5, the top cap assembly 40 in the embodiment of the present application includes a top cap plate 50, an electrode terminal 60, a current collecting member 70 and an insulating protection member 80. The top cap plate 50 has an outer surface and an inner surface oppose to each other in a thickness direction X of itself, and an electrode lead-out hole 50a extending in the thickness direction X. The electrode terminal 60 is arranged on the top cap plate 50 and covers the electrode lead-out hole 50*a*. In an example, the electrode terminal 60 is arranged on an outside of the electrode lead-out hole 50*a*. The current collecting member 70 is used for electrically connecting with the tab. The current collecting member 70 includes a convex portion 71 having an accommodating cavity 71*a*. At least part of the convex portion 71 is arranged in the electrode lead-out hole 50*a*, and welded and connected to the electrode terminal 60 to form a welding portion 90 facing the accommodating cavity 71*a*. When a welding operation is performed, the convex portion 71 and the electrode terminal 60 are welded from a side of the convex portion 71 away from the electrode terminal 60. In some embodiments, the convex 71 is welded and connected to the electrode terminal 60 by laser welding or thermal fusion welding. The current collecting member 70 has a connecting hole 73. The connecting hole 73 has a first opening 73*a* formed on the surface of the current collecting member 70 away from the electrode terminal 60. The insulating protection member 80 is arranged on a side of the current collecting member 70 away from the electrode terminal 60. The insulating protection member 80 includes a shielding portion 81 and a connecting portion 82 connected to the shielding portion 81. The insulating protection member 80 shields the welding portion 90 by the shielding portion 81. At least part of the connecting portion 82 extends into the connecting hole 73 through the first opening 73*a* and is connected and fixed to the current collecting member 70.

After the top cap assembly 40 in the embodiment of the present application connects and fixes the electrode terminal 60 with the top cap plate 50, the convex portion 71 of the current collecting member 70 is welded and connected to the electrode terminal 60 by the way of welding. The insulating protection member 80 is connected and fixed to the current collecting member 70 through the connecting portion 82, and the shielding portion 81 of the insulating protection member 80 shields the welding portion 90. Since the shielding portion 81 shields and covers the welding portion 90, the shielding portion 81 can block the metal chips attached to the welding portion 90, thereby reducing the possibility of the metal chips falling from the welding portion 90 to the electrode assembly 32 after the top cap assembly 40 is applied to the secondary battery 30, so that it can reduce the possibility of the metal chips piercing the separator of the electrode assembly 32 to cause an internal short circuit between two electrode sheets having opposite polarities, and effectively improve the operational safety of the secondary battery 30.

Figure 6:
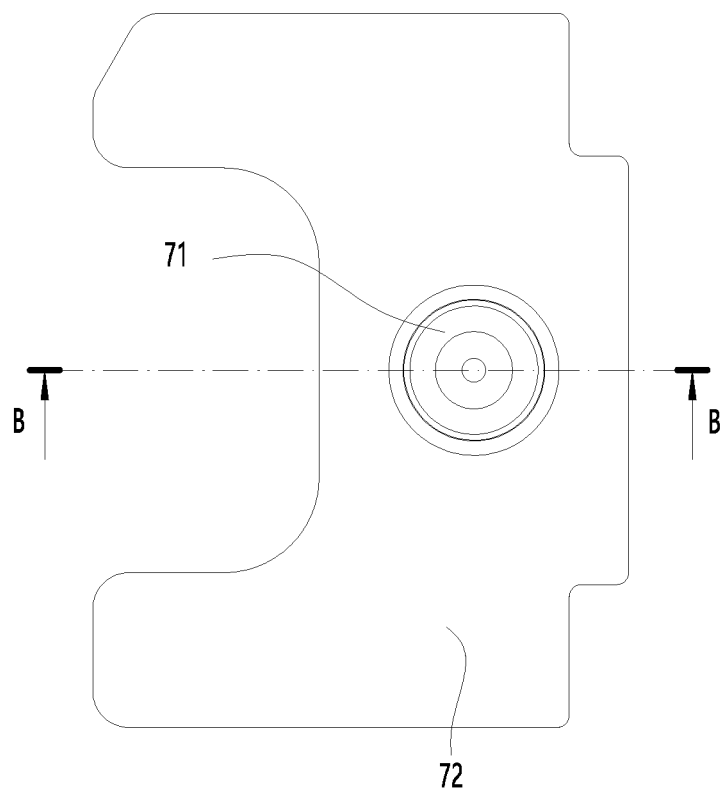
FIG. 6 shows a structural schematic view of a current collecting member according to an embodiment of the present application.
Figure 7:
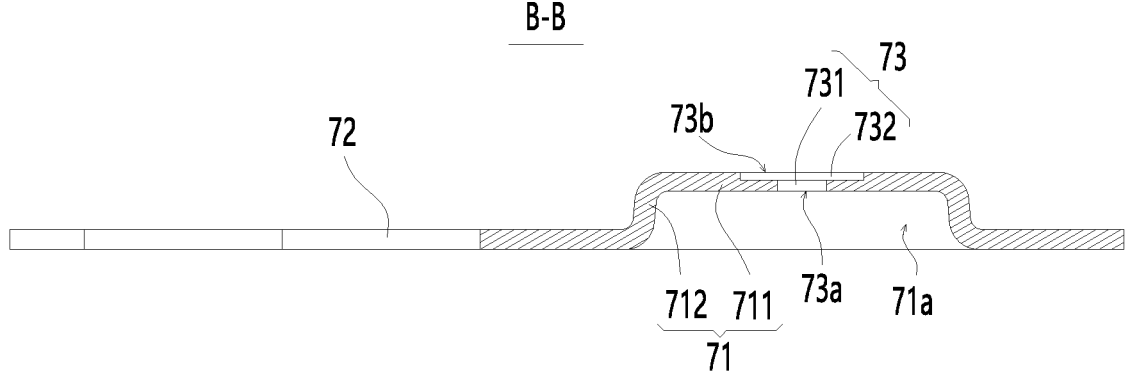
FIG. 7 shows a cross-sectional view along a line B-B in FIG. 6.

In an embodiment, as shown in FIG. 5 to FIG. 7, the convex portion 71 has a top wall 711 and a side wall 712. The top wall 711 is welded and connected to the electrode terminal 60 to form the welding portion 90. The connecting hole 73 is formed on the top wall 711. At least part of the shielding portion 81 is arranged in the accommodating cavity 71*a*. The circumferential surface of the shielding portion 81 is in contact and sealing with the side wall 712, so that the ability of the shielding portion 81 to block the metal chips can be further improved, and the possibility of the metal chips falling from between the shielding portion 81 and the side wall 712 can be reduced. The connecting portion 82 is arranged on a surface of the shielding portion 81 facing the top wall 711.

Figure 8:
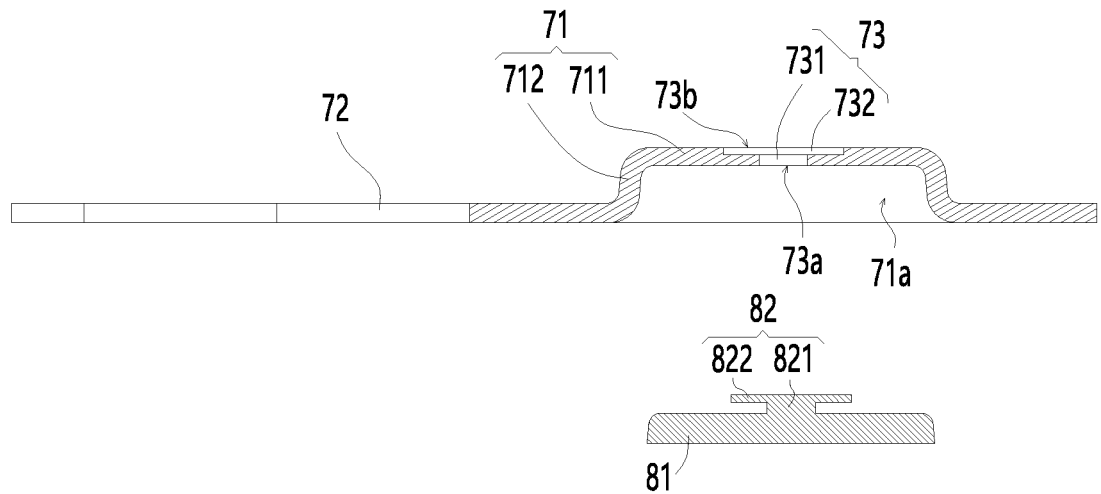
FIG. 8 shows an exploded structural schematic view of a current collecting member and an insulating protection member according to an embodiment of the present application.
Figure 9:
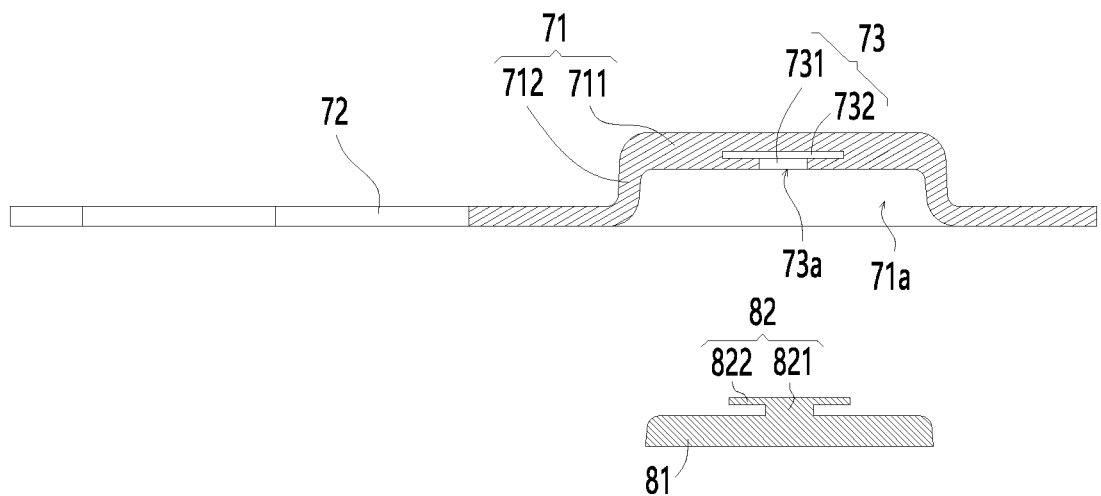
FIG. 9 shows an exploded structural schematic view of a current collecting member and an insulating protection member according to another embodiment of the present application.

In an example, as shown in FIG. 7, the connecting hole 73 includes a first hole segment 731 and a second hole segment 732. The first hole segment 731 is close to the accommodating cavity 71*a* and communicates with the accommodating cavity 71*a*, and the second hole segment 732 is located on a side of the first hole segment 731 away from the accommodating cavity 71*a*. A hole diameter of the second hole segment 732 is larger than a hole diameter of the first hole segment 731, so that a step surface is formed between the first hole segment 731 and the second hole segment 732. A shape of the connecting portion 82 matches with a shape of the connecting hole 73. As shown in FIG. 8, the connecting portion 82 includes a first connecting segment 821 and a second connecting segment 822. A radial dimension of the second connecting segment 822 is greater than a radial dimension of the first connecting segment 821. The first connecting segment 821 is connected to the shielding portion 81. The first connecting segment 821 is located at the first hole segment 731, the second connecting segment 822 is located at the second hole segment 732, and the second connecting segment 822 covers the first hole segment 731, thereby improving the stability and the reliability of the connection between the connecting portion 82 and the top wall 711, and reducing the possibility of the connecting portion 82 falling off the top wall 711. Since the insulating protection member 80 is connected and fixed to the current collecting member 70 through the connecting portion 82, the possibility is reduced that the insulating protection member 80 is likely to fall off when the insulating protection member 80 is in contact with the electrolyte for a long time or is subjected to the vibration. In some embodiments, the insulating protection member 80 can be processed and manufactured by an injection molding process or a glue injection curing method, so that the connecting portion 82 and the shielding portion 81 can be formed integrally, and the connection strength of the connecting portion 82 and the shielding portion 81 can be improved. In some embodiments, as shown in FIG. 8, the connecting hole 73 may be a passing-through hole. The second hole segment 732 has a second opening 73*b* formed on the surface of the current collecting member 70 facing the electrode terminal 60. The second connecting segment 822 does not extend beyond an edge of the second opening 73*b*, thereby reducing the possibility that a positional interference between the second connecting segment 822 and the electrode terminal 60 occurs. In some embodiments, as shown in FIG. 9, the connecting hole 73 may be a blind hole. The first hole segment 731 and the second hole segment 732 are formed in the top wall 711 of the convex portion 71. The first opening 73*a* of the first hole segment 731 is formed on a surface of the top wall 711 facing the accommodating cavity 71*a*.

Figure 10:
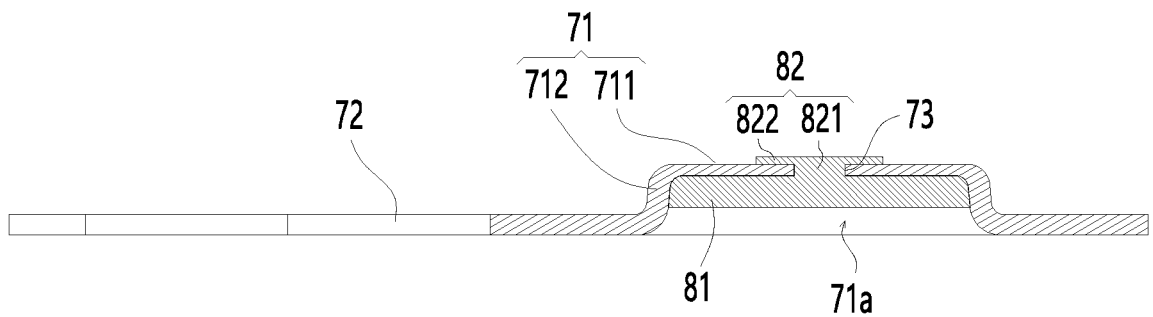
FIG. 10 shows a cross-sectional structural schematic view of a current collecting member and an insulating protection member according to another embodiment of the present application.

In another example, as shown in FIG. 10, the connecting hole 73 is a straight hole passing through the top wall 711 of the convex portion 71. The first connecting segment 821 of the connecting portion 82 is located in the connecting hole 73, and the second connecting segment 822 is located at an outside of the connecting hole 73. In a radial direction of the connecting hole 73, a part of the second connecting segment 822 that extends over the first connecting segment 821 is in contact with a surface of the top wall 711 facing the electrode terminal 60, thereby improving the stability and the reliability of the connection between the connecting portion 82 and the top wall 711, and reducing the possibility of the connecting portion 82 falling off the top wall 711. In some embodiments, the connecting hole 73 may be a tapered hole passing through the top wall 711 of the convex portion 71.

Figure 11:
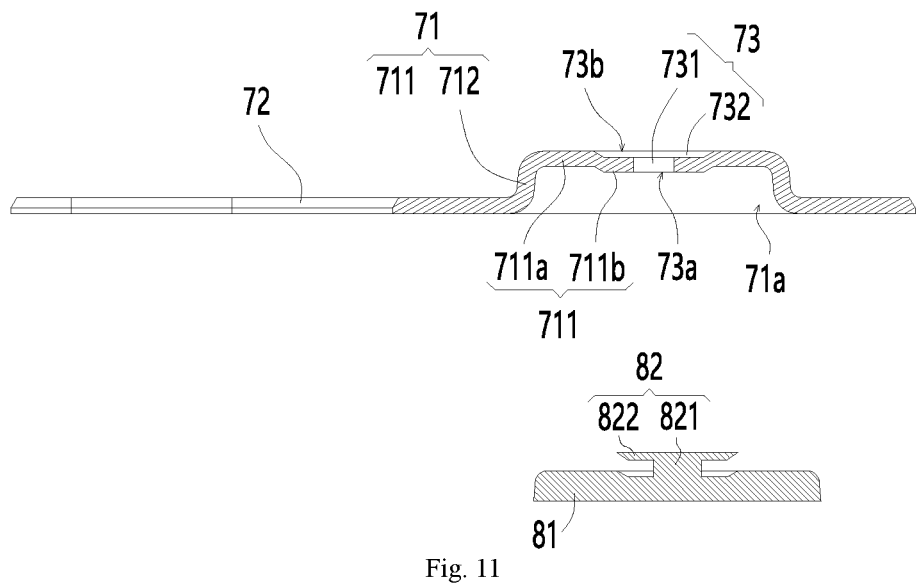
FIG. 11 shows an exploded structural schematic view of a current collecting member and an insulating protection member according to another embodiment of the present application.

In another example, as shown in FIG. 11, the top wall 711 of the convex portion 71 includes a flat portion 711*a* and a boss 711*b* protruding from the flat portion 711*a* toward the accommodating cavity 71*a*. The flat portion 711*a* is welded and connected to the electrode terminal 60, and the first opening 73a is formed on the top surface of the boss 711b facing the accommodating cavity 71a. The connecting hole 73 passes through a top surface of the boss 711b and a surface of the flat portion 711a facing the electrode terminal 60. The first connecting segment 821 of the connecting portion 82 is located at the first hole segment 731 of the connecting hole 73, and the second connecting portion 82 is located at the second hole segment 732 of the connecting hole 73. The shielding portion 81 of the insulating protection member 80 is provided with a concave portion that matches with the boss 711b. In some embodiments, the top wall 711 has a thin-sheet structure, and the boss 711b and the first hole segment 731 and the second hole segment 732 of the connecting hole 73 can be formed at one time by a punching process. Compared with other processing methods, the punching method can ensure that a thickness of the top wall 711 and a thickness of the side wall 712 remain the same, thereby ensuring that the top wall 711 itself has good structural rigidity.

Figure 12:
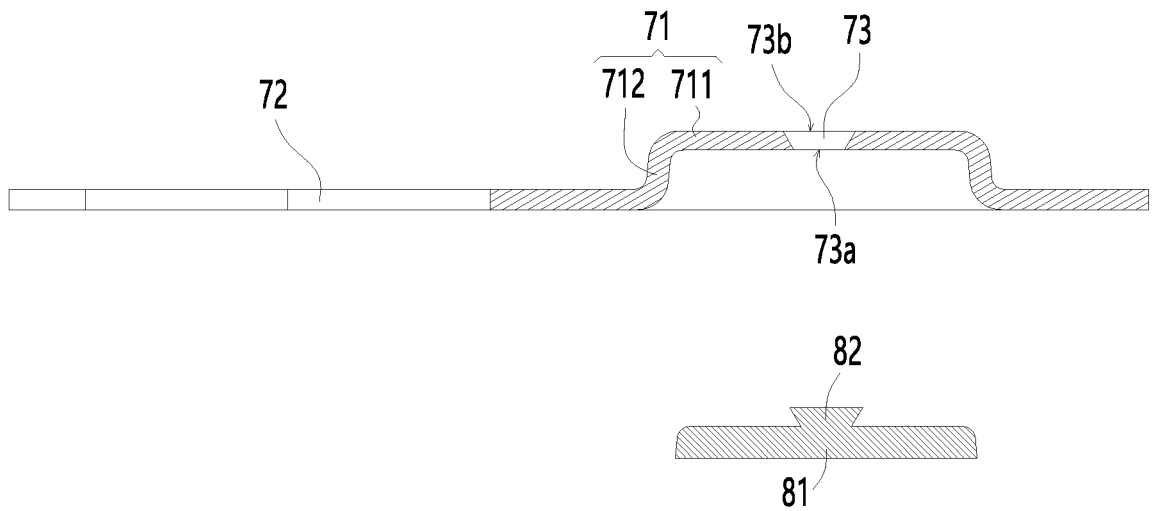
FIG. 12 shows an exploded structural schematic view of a current collecting member and an insulating protection member according to another embodiment of the present application.

In another example, as shown in FIG. 12, the connecting hole 73 passes through the top wall 711. The connecting hole 73 itself is the tapered hole. The connecting portion 82 is also taper-shaped. The connecting hole 73 has the second opening 73b formed on the surface of the top wall 711 facing the electrode terminal 60. In some embodiments, the connecting portion 82 does not extend over the edge of the second opening 73b.

In an embodiment, as shown in FIG. 5, the connecting hole 73 is formed on the top wall 711 of the convex portion 71. The welding portion 90 is in the shape of ring, and the connecting hole 73 is formed within the welding portion 90. Since an area of the top wall 711 located in the welding portion 90 is a no-current-passing area, the connecting hole 73 is formed within the welding portion 90 without affecting or reducing the current-passing capability of the current collecting member 70.

Figure 13:
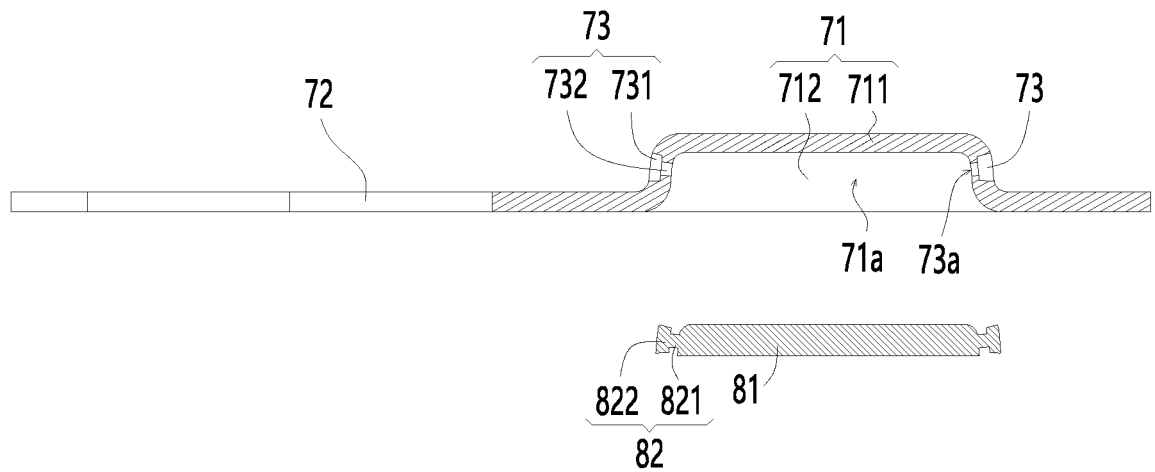
FIG. 13 shows an exploded structural schematic view of a current collecting member and an insulating protection member according to another embodiment of the present application.

In an embodiment, as shown in FIG. 13, the convex portion 71 has the top wall 711 and the side wall 712. The top wall 711 is welded and connected to the electrode terminal 60 to form the welding portion 90. The connecting hole 73 is formed on the side wall 712 of the convex portion 71. At least part of the shielding portion 81 is arranged in the accommodating cavity 71a. The connecting portion 82 is arranged on the surface of the shielding portion 81 facing the side wall 712. In an example, the connecting hole 73 includes the first hole segment 731 and the second hole segment 732. The first hole segment 731 is close to the accommodating cavity 71a and communicates with the accommodating cavity 71a, and the second hole segment 732 is located at the side of the first hole segment 731 away from the accommodating cavity 71a. The hole diameter of the second hole segment 732 is larger than the hole diameter of the first hole segment 731, so that the step surface is formed between the first hole segment 731 and the second hole segment 732. The shape of the connecting portion 82 matches with the shape of the connecting hole 73. The connecting portion 82 includes the first connecting segment 821 and the second connecting segment 822. The radial dimension of the second connecting segment 822 is greater than the radial dimension of the first connecting segment 821. The first connecting segment 821 is connected to the shielding portion 81. The first connecting segment 821 is located at the first hole segment 731, the second connecting segment 822 is located at the second hole segment 732, and the second connecting segment 822 covers the first hole segment 731, thereby improving the stability and the reliability of the connection between the connecting portion 82 and the top wall 711, and reducing the possibility of the connecting portion 82 falling off the top wall 711. In some embodiments, the insulating protection member 80 can be processed and manufactured by an injection molding process or a glue injection curing method, so that the connecting portion 82 and the shielding portion 81 can be formed integrally, and the connection strength of the connecting portion 82 and the shielding portion 81 can be improved. In some embodiments, the connecting hole 73 passes through the side wall 712 of the convex portion 71. The connecting hole 73 has the second opening 73b formed on a surface of the side wall 712 away from the accommodating cavity 71a. In some embodiments, the connecting hole 73 is the blind hole formed on the side wall 712. The second hole segment 732 is formed in the side wall 712 of the convex portion 71. The first opening 73a of the connecting hole 73 is formed in the first hole segment 731 and is located on the surface of the side wall 712 facing the accommodating cavity 71a.

In another example, the connecting hole 73 is the straight hole or the tapered hole passing through the side wall 712 of the convex portion 71. The first connecting segment 821 of the connecting portion 82 is located in the connecting hole 73, and the second connecting segment 822 is located at the outside of the connecting hole 73. In the radial direction of the connecting hole 73, a part of the second connecting segment 822 that extends over the first connecting segment 821 is in contact with the surface of the side wall 712 away from the accommodating cavity 71a, thereby improving the stability and the reliability of the connection between the connecting portion 82 and the top wall 711, and reducing the possibility of the connecting portion 82 falling off the side wall 712.

In another example, the connecting hole 73 is the tapered hole passing through the convex portion 71. The connecting hole 73 has the second opening 73b formed on the surface of the side wall 712 away from the accommodating cavity 71a. A dimension of the second opening 73b of the connecting hole 73 is greater than a dimension of the first opening 73a. The shape of the connecting portion 82 matches with the shape of the connecting hole 73. The connecting portion 82 does not extend over the edge of the second opening 73b.

Figure 14:
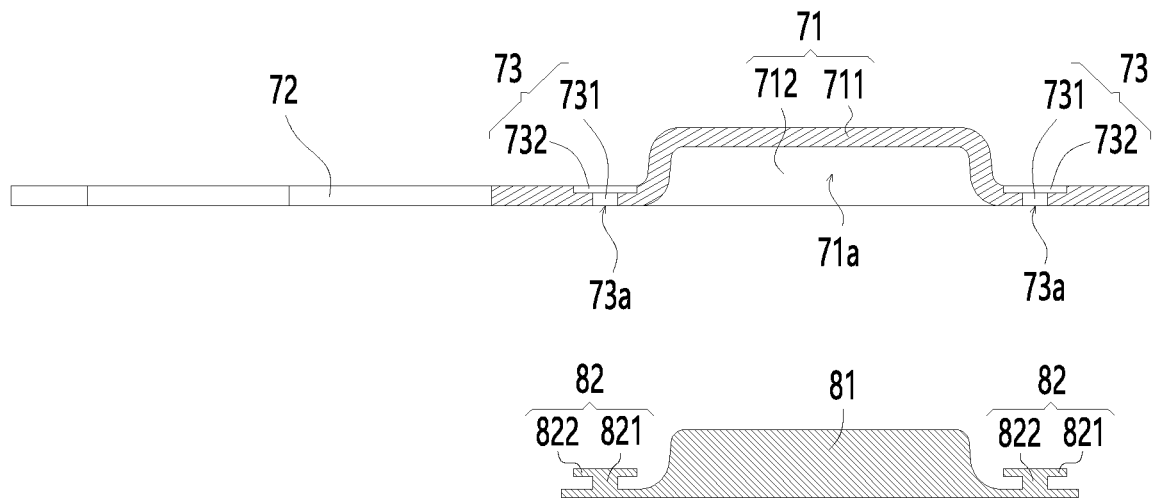
FIG. 14 shows an exploded structural schematic view of a current collecting member and an insulating protection member according to another embodiment of the present application.

In an embodiment, as shown in FIG. 14, the current collecting member 70 further includes a main body 72 arranged at a side of the top cap plate 50. The convex portion 71 is connected to the main body 72. The convex portion 71 includes the side wall 712 and the top wall 711. The top wall 711 of the convex portion 71 is welded and connected to the electrode terminal 60. The side wall 712 of the convex portion 71 is connected to the main body 72. In some embodiments, the convex portion 71 and the main body 72 are formed integrally. The connecting hole 73 is formed in the main body 72. At least part of the shielding portion 81 is arranged in the accommodating cavity 71a. The connecting portion 82 is located at an outside of an opening of the accommodating cavity 71a and extends into the connecting hole 73 to be connected and fixed to the main body 72. In an example, the connecting hole 73 includes the first hole segment 731 and the second hole segment 732. The first hole segment 731 is away from the top cap plate 50, and the second hole segment 732 is close to the top cap plate 50. The first opening 73a of the connecting hole 73 is formed in the first hole segment 731 and is located on a surface of the main body 72 away from the top cap plate 50. The hole diameter of the second hole segment 732 is larger than the hole diameter of the first hole segment 731, so that the step surface is formed between the first hole segment 731 and the second hole segment 732. The shape of the connecting portion 82 matches with the shape of the connecting hole 73. The connecting portion 82 includes the first connecting segment 821 and the second connecting segment 822. The radial dimension of the second connecting segment 822 is greater than the radial dimension of the first connecting segment 821. The first connecting segment 821 is connected to the shielding portion 81. The first connecting segment 821 is located at the first hole segment 731, the second connecting segment 822 is located at the second hole segment 732, and the second connecting segment 822 covers the first hole segment 731, thereby improving the stability and the reliability of the connection between the connecting portion 82 and the top wall 711, and reducing the possibility of the connecting portion 82 falling off the top wall 711. In some embodiments, the insulating protection member 80 can be processed and manufactured by the injection molding process or the glue injection curing method, so that the connecting portion 82 and the shielding portion 81 can be formed integrally, and the connection strength of the connecting portion 82 and the shielding portion 81 can be improved. In some embodiments, the connecting hole 73 passes through the main body 72. The connecting hole 73 has a second opening 73b formed on the surface of the main body 72 closing to the top cap plate 50. In some embodiments, the connecting hole 73 is the blind hole formed in the main body 72. The first hole segment 731 and the second hole segment 732 are formed in the main body 72. The first opening 73a of the connecting hole 73 is formed in the first hole segment 731 and is located on the surface of the main body 72 away from the top cap plate 50.

In another example, the connecting hole 73 is the straight hole or the tapered hole passing through the main body 72. The first connecting segment 821 of the connecting portion 82 is located in the connecting hole 73, and the second connecting segment 822 is located at the outside of the connecting hole 73. In the radial direction of the connecting hole 73, the part of the second connecting segment 822 that extends over the first connecting segment 821 is in contact with the surface of the main body 72 close to the top cap plate 50, thereby improving the stability and the reliability of the connection between the connecting portion 82 and the main body 72, and reducing the possibility of the connecting portion 82 falling off the main body 72.

In another example, the connecting hole 73 is the tapered hole passing through the main body 72. The connecting hole 73 has the second opening 73b formed on the surface of the main body 72 closing to the top cap plate 50. The dimension of the second opening 73b of the connecting hole 73 is greater than the dimension of the first opening 73a. The shape of the connecting portion 82 matches with the shape of the connecting hole 73. The connecting portion 82 does not extend over the edge of the second opening 73b.

Figure 15:
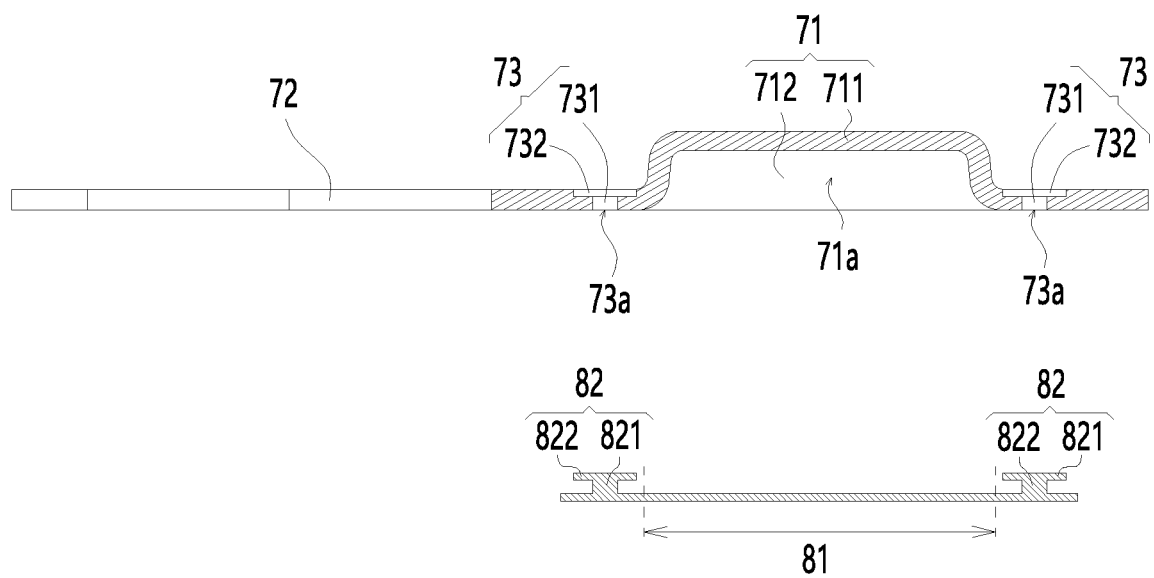
FIG. 15 shows an exploded structural schematic view of a current collecting member and an insulating protection member according to another embodiment of the present application.

In an example, as shown in FIG. 14, the connecting portion 82 of the insulating protection member 80 is connected to the main body 72, and at least part of the shielding portion 81 is filled in the accommodating cavity 71a, and the part extending into the accommodating cavity 71a is in contact with an inner wall of the convex portion 71. In another example, as shown in FIG. 15, the connecting portion 82 of the insulating protection member 80 is connected to the main body 72, and the shielding portion 81 is located at an outside of the accommodating cavity 71a and covers an opening of the shielding portion 81.

The top cap assembly 40 in the embodiments of the present application includes the electrode terminal 60, the current collecting member 70 welded and connected to the electrode terminal 60, and the insulating protection member 80 connected to the current collecting member 70. The current collecting member 70 includes the convex portion 71 protruding toward the electrode terminal 60. The convex portion 71 has the accommodating cavity 71a. The convex portion 71 is welded and connected to the electrode terminal 60 and forms the welding portion 90 facing the accommodating cavity 71a. The insulating protection member 80 is connected and fixed to the current collecting member 70 through the connecting portion 82. The insulating protection member 80 shields the welding portion 90 by the shielding portion 81, and since the shielding portion 81 covers the welding portion 90, the shielding portion 81 can block the metal chips attached to the welding portion 90, so that after the top cap assembly 40 is applied to the secondary battery 30, the possibility of the metal chips falling from the welding portion 90 to the electrode assembly 32 can be reduced.

Although the present application has been described with reference to the preferred embodiments, various modifications can be made to the present application and the components in the present application can be replaced with equivalents without departing from the scope of the present application. In particular, as long as there is no structural conflict, various technical features mentioned in the various embodiments can be combined in any way. The present application is not limited to the specific embodiments disclosed in the text, but includes all technical solutions falling within the scope of claims.

What is claimed is:

1. A top cap assembly for a secondary battery, the top cap assembly comprising
    a top cap plate, having an electrode lead-out hole;
    an electrode terminal, arranged at the top cap plate and covering the electrode lead-out hole;
    a current collecting member, wherein the current collecting member comprises a convex portion having an accommodating cavity, at least part of the convex portion is arranged in the electrode lead-out hole, and welded and connected to the electrode terminal to form a welding portion facing the accommodating cavity, the current collecting member has a connecting hole, and the connecting hole has a first opening formed on a surface of the current collecting member away from the electrode terminal;
    an insulating protection member, wherein the insulating protection member is arranged at a side of the current collecting member away from the electrode terminal, the insulating protection member comprises a shielding portion and a connecting portion connected with the shielding portion, the shielding portion shields the welding portion, and at least part of the connecting portion extends into the connecting hole through the first opening and is connected and fixed to the current collecting member.

2. The top cap assembly according to claim 1, wherein the convex portion has a top wall and a side wall, the top wall is welded and connected to the electrode terminal to form the welding portion, the connecting hole is formed in the top wall, at least part of the shielding portion is arranged in the accommodating cavity, and the connecting portion is arranged on a surface of the shielding portion facing the top wall.

3. The top cap assembly according to claim 2, wherein the welding portion is in the shape of ring, and the connecting hole is formed within the welding portion.

4. The top cap assembly according to claim 2, wherein the top wall comprises a flat portion and a boss protruding from the flat portion toward the accommodating cavity, the flat portion is welded and connected to the electrode terminal, and the first opening is formed on a top surface of the boss.

5. The top cap assembly according to claim 2, wherein a circumference surface of the shielding portion is in contact and sealing with the side wall.

6. The top cap assembly according to claim 2, wherein the connecting portion comprises a first connecting segment and a second connecting segment, the first connecting segment is connected to the shielding portion, the connecting hole is a passing-through hole, the first connecting segment is located in the connecting hole, the second connecting segment is located at an outside of the connecting hole, and the second connecting segment completely covers the connecting hole.

7. The top cap assembly according to claim 2, wherein the connecting hole is a tapered hole, and the connecting portion is in a tapered shape.

8. The top cap assembly according to claim 2, wherein the connecting hole comprises a first hole segment and a second hole segment, the second hole segment is located at a side of the first hole segment away from the insulating protection member, and a radial dimension of the second hole segment is greater than a radial dimension of the first hole segment, the connecting portion comprises a first connecting segment and a second connecting segment, the first connecting segment is connected to the shielding portion, the first connecting segment is located in the first hole segment, and the second connecting segment is located in the second hole segment and covers the first hole segment.

9. The top cap assembly according to claim 8, wherein the connecting hole is a passing-through hole, the connecting hole has a second opening formed on a surface of the current collecting member facing the electrode terminal, and the second connecting segment does not extend over an edge of the second opening.

10. The top cap assembly according to claim 8, wherein the connecting hole is a blind hole, the first hole segment and the second hole segment are formed in the top wall of the convex portion, and the first opening of the first hole segment is formed on a surface of the top wall facing the accommodating cavity.

11. The top cap assembly according to claim 1, wherein the convex portion has a top wall and a side wall, the top wall is welded and connected to the electrode terminal, the connecting hole is formed in the side wall, at least part of the shielding portion is arranged in the accommodating cavity, and the connecting portion is arranged on a surface of the shielding portion facing the side wall.

12. The top cap assembly according to claim 1, wherein the current collecting member further comprises a main body, the convex portion is connected to the main body, the connecting hole is formed in the main body, at least part of the shielding portion is arranged in the accommodating cavity, and the connecting portion is located at an outside of an opening of the accommodating cavity and extends into the connecting hole to be connected and fixed to the main body.

13. The top cap assembly according to claim 1, wherein the connecting portion and the shielding portion are formed integrally.

14. A secondary battery, comprising
a case;
an electrode assembly, arranged in the case;
the top cap assembly according to claim 1, wherein the top cap plate is sealed and connected to the case, and the current collecting member is connected to the electrode assembly.

15. The secondary battery according to claim 14, wherein the convex portion has a top wall and a side wall, the top wall is welded and connected to the electrode terminal to form the welding portion, the connecting hole is formed in the top wall, at least part of the shielding portion is arranged in the accommodating cavity, and the connecting portion is arranged on a surface of the shielding portion facing the top wall.

16. The secondary battery according to claim 15, wherein the welding portion is in the shape of ring, and the connecting hole is formed within the welding portion.

17. The secondary battery according to claim 15, wherein the top wall comprises a flat portion and a boss protruding from the flat portion toward the accommodating cavity, the flat portion is welded and connected to the electrode terminal, and the first opening is formed on a top surface of the boss.

18. The secondary battery according to claim 14, wherein the convex portion has a top wall and a side wall, the top wall is welded and connected to the electrode terminal, the connecting hole is formed in the side wall, at least part of the shielding portion is arranged in the accommodating cavity, and the connecting portion is arranged on a surface of the shielding portion facing the side wall.

19. A battery module, comprising the secondary battery according to claim 14.

20. A device comprising a secondary battery used as a power source, wherein the secondary battery is the secondary battery according to claim 14.

* * * * *